Dec. 4, 1951

C. JOHNSON 2,577,128

MACHINE TOOL CONTROL

Original Filed May 27, 1944

INVENTOR.
CLARENCE JOHNSON
BY
Raymond W. Jenkins
ATTORNEY

Patented Dec. 4, 1951

2,577,128

UNITED STATES PATENT OFFICE 2,577,128

MACHINE-TOOL CONTROL

Clarence Johnson, Orfordville, Wis., assignor to Bailey Meter Company, a corporation of Delaware Original application May 27, 1944, Serial No. 537,606, now Patent No. 2,422,682, dated June 24, 1947. Divided and this application September 6, 1946, Serial No. 695,110

7 Claims. (Cl. 82—14)

This invention relates to duplicators for controlling the operation of a material forming machine so that a work piece is formed to a contour or configuration determined by a template, pattern, sample, or the like.

One of the objects of my invention is to improve the sensitivity of contour control of the type described, and to thereby increase the accuracy with which the work piece is formed.

A further object of my invention is to provide a contour control of materially simpler construction than those now available.

In accordance with my invention the pattern or sample for producing the desired configuration on the work piece is scanned by a tracer regulating a jet of fluid discharged to the atmosphere from a nozzle. Follower means responsive to variations in the shape of the sample cause corresponding changes in the rate of fluid discharged from the nozzle, which fluid discharge rate changes and consequent pressure fluctuations are then used to control the relative positioning of the tool and work piece. Further, in accordance with my invention, changes in fluid pressure control the relative positioning of the tool and work piece through the agency of a hydraulic relay and servo-motor to the end that ample power is available for accurately positioning the tool relative to the work piece, or vice versa.

Obviously a duplicator or contour control of the type forming the subject matter of this invention may be employed with material forming machines or machine tools of various types, such for example as milling machines, lathes, slotters, planers, die sinking machines, and other machines in which the relative feed between the tool and work may be suitably controlled. By way of example I illustrate and will describe my invention as applied to metal working lathes. Further applications and modifications of the invention will be readily apparent.

As is well understood by those familiar with the art, in some machine tools, such as lathes, the tool is moved longitudinally and transversely of the work piece, which except for rotation about its center remains stationary. In other machine tools, such as some types of milling machines, the work piece may be moved in two directions, while the tool except for rotation about its axis remains stationary. In some other types of milling machines, and usually in die sinking machines, the tool may be moved in one or more directions and the work piece may also be moved in one or more directions. In all instances it will be observed, however, that it is the relative movement between the tool and work piece that causes the work piece to be formed to a desired shape. As a preferred embodiment I have chosen to illustrate and describe my invention incorporated in a lathe wherein the work piece, except for rotation about its center, remains stationary and the tool is moved transversely and longitudinally thereof. It will be evident that my invention is applicable to a wide variety of machine tools and that when I speak of relative movement between the tool and work piece I include either an arrangement where the tool is stationary and the work piece is moved, or where the work piece is stationary and the tool is moved, or a combination of the two.

Figure 1:
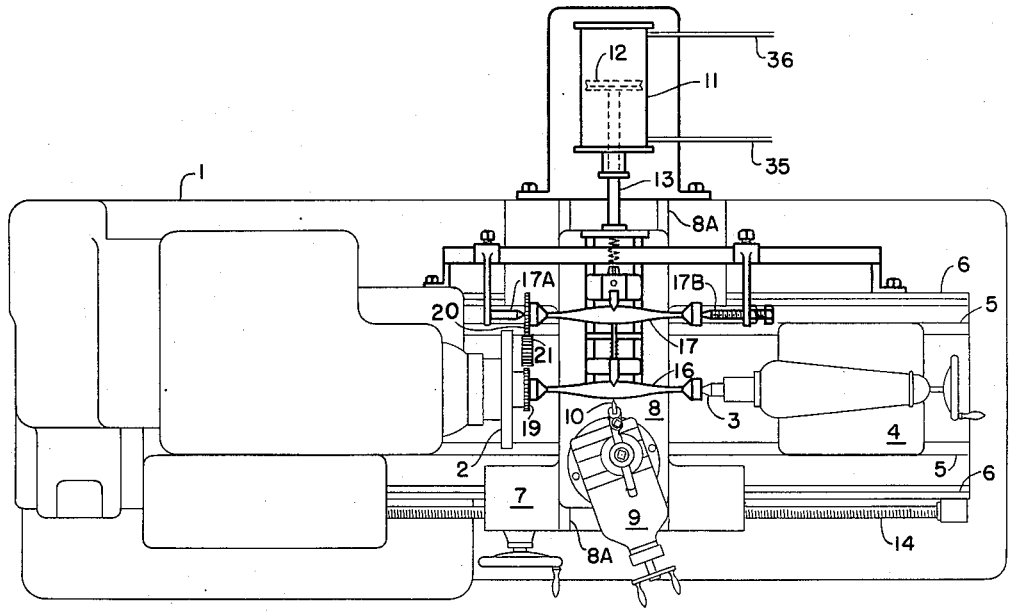
Fig. 1 is a plan view of an engine lathe illustrating an application of my invention thereto.

Referring now to Fig. 1, I show my invention applied to an engine lathe 1 having a headstock 2 adapted to be rotated by any suitable means. A carriage 4 is movable longitudinally along the bed of the lathe in suitable ways 5 and supports the tailstock 3. Also movable longitudinally along the bed of the lathe in suitable ways 6 is a carriage 7 upon which is mounted a cross-slide 8 movable on ways 8A transversely of the carriage 7, and therefore of the bed of the lathe.

The cross-slide 8 is provided with an adjustable tool support 9 in which is secured a tool 10. Transverse movements of the tool 10 are produced through the agency of a hydraulic cylinder 11 having a piston 12 adapted to position the cross-slide 8 along the ways 8A through the agency of a piston rod 13. Longitudinal movements of the tool 10, that is movements of the tool parallel to the bed of the lathe in a longitudinal direction, are produced by the usual lead screw 14, which positions the entire carriage 7 along the ways 6.

Supported by the headstock 2 and tailstock 3 is a work piece 16 which, for illustrative purposes, is shown as having been formed to a slender, tapered form by the tool 10. The particular shape has no significance, it being apparent as the description proceeds that by my invention the work piece may be formed automatically to almost any desired contour. The present invention is, however, particularly directed to the forming of work pieces of such a slenderness that during the machining operation the cutting pressure of the tool may cause a deflection of the work piece, or wear of the tool may throw an inaccuracy into the final product as compared to the pattern or sample.

Furthermore, the present invention is concerned with the reproduction of work pieces from a sample or pattern rather than from a template or cam. Certain objects, such for example as fuel injection nozzles, can be roughly designed mathematically, but in final form must be shaped to produce a result or calibration desired. Such shaping can usually only be accomplished by grinding, filing, or turning as calibration proceeds until a shape or contour is obtained which will produce the desired result or calibration. Thereafter it is desired that this final contour or shape of the sample be reproduced upon numerous nozzles which are desirably to have the same calibration as the pattern or sample.

In Fig. 1 the sample 17 has the contour which it is desired to reproduce upon the work piece 16. The sample 17 is mounted upon centers 17A and 17B in axial parallelism with the work piece 16 and in transverse alignment therewith.

The present application constitutes a division of my copending Patent No. 2,422,682, issued June 24, 1947, entitled "Machine Tool Control."

Slideable on the cross-slide 8 is a member 75 spring pressed toward the left (in the drawing, Fig. 2) by a spring 76. The member 75 is movable along ways 77 between stops 78 and 79. Within its limits of travel and under all normal operating conditions the member 75 has its V edge engaging a portion of the periphery of the sample 17, as is clearly illustrated in the drawing.

In similar manner a member 80 is slideable along ways 81 between travel limits 78 and 82 and is normally spring pressed by a spring 83 towards the left with its V contact edge engaging a portion of the periphery of the work piece 16. Thus under all normal operating conditions the member 75 feels the diameter of the sample 17 while the member 80 feels the diameter of the work piece 16.

The member 75 forms the housing of an air bleed valve having a stem or controlling member 84 adjustably connected to the member 80 by way of adjustment screw 85. The assembly 75, 84 controls the bleed to atmosphere of air supplied from a pipe 25.

Air under pressure from any convenient source is passed through a pressure regulator 22 and through an orifice 26 to the pipe 25. As the discharge from the assembly 75, 84 to the atmosphere varies, the pressure within the pipe 25 will vary, and such controlled air pressure representative of the relative positions of the element 75, 84 is effective upon a bellows 27 of a pilot valve assembly 28. The pilot valve assembly 28 is more fully illustrated, described and claimed in the copending applications of Frederick A. Barnes, Patent No. 2,486,097, and of Clarence Johnson, Patent No. 2,475,326.

I show an oil pump 31 driven by a motor 32 and drawing its supply of oil from a sump 33. Oil under pressure is supplied the pilot valve 28 by the pump 31 through a pipe 34. From the pilot valve 28 oil is supplied to one end or the other of the hydraulic motor 11 through the pipes 35 or 36. Drainage from the pilot 28 is returned to the sump 33 through a pipe 37. The position of the piston rod 13 is determined by the relative position of the member 75, 84 and the rate of bleed of air to the atmosphere resulting therefrom.

Figure 2:
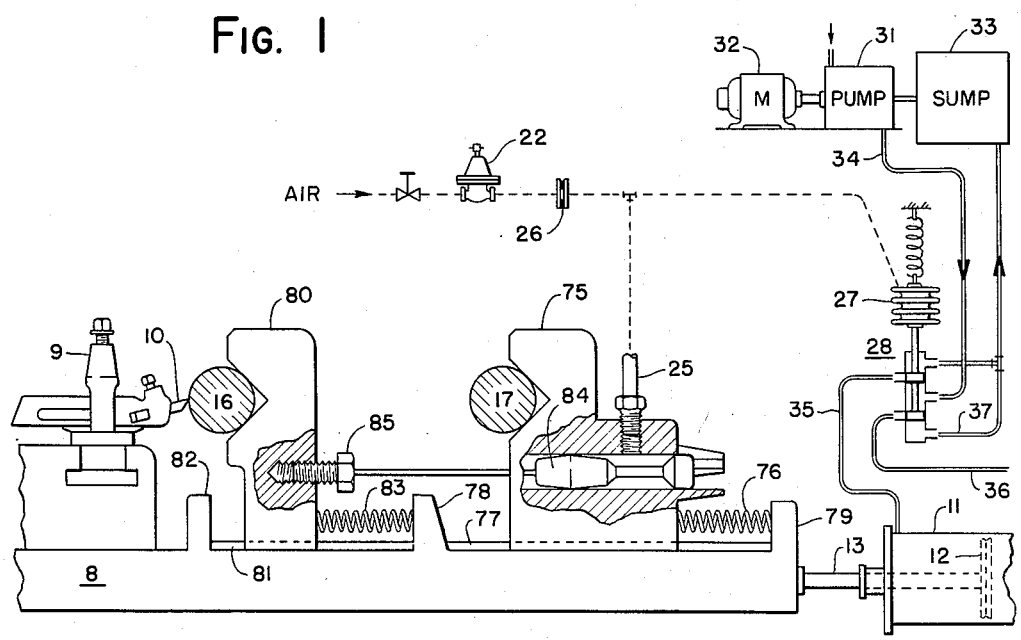
Fig. 2 is a side elevation of a portion of Fig. 1 and to which has been added the fluid pressure and hydraulic circuits interconnecting the various portions.

The operation of this size control arrangement is as follows. The assembly illustrated in Fig. 2 is traveled by the carriage 7 (through the agency of the lead screw 14) longitudinally of the lathe. If the sample 17 is cylindrical, then the relative position of the member 75, 84 is unvaried, the bleed of air from the pipe 25 to atmosphere is uniform, the piston rod 13 is stationary, and the cross-slide 8 travels longitudinally at a uniform normal speed with the tool 10 cutting the work piece to a cylindrical shape in conformity with the shape of the sample 17.

If for example the sample is tapered with diameter increasing in the direction of longitudinal travel of the slide 8 (away from the viewer of Fig. 2) then member 75 will be urged toward the right as the diameter of sample 17 increases. The movement of member 75 relative to the control member 84 varies the discharge to atmosphere of air from the pipe 25 and effects a control of the servo-motor 11 in direction to position the piston rod 13 and cross-slide 8 toward the left whereby the tool 10 will cut at an increasingly large diameter on the work piece 16. As the diameter of the work piece 16 grows the member 80 is moved toward the right, thus causing a follow-up of the control member 84 relative to the member 75 to return the bleed of air to the atmosphere toward the predetermined normal rate, and thus tend to stop movement of the piston rod 13. If the contour of the sample 17 is a uniform taper the resulting action will be that the members 75, 84 are continuously a slight amount away from original position relationship, and therefore resulting in a slight uniform different rate of air discharge from the pipe 25 and a uniform continuous movement of the piston rod 13 toward the left. Such action resulting from the uniform movement of the tool 10 toward the left as the assembly travels longitudinally along the work piece results in a turning of the work piece 16 to a uniform taper corresponding to the sample 17. A similar action is obtained if the taper on the sample 17 is uniformly decreasing in diameter away from the viewer of Fig. 2, except that the piston rod 13 is continuously and uniformly moving the tool 10 toward the right to cut the work piece 16 to a uniform taper.

The arrangement provides a continuous size control or check between the diameter at which the tool 10 is cutting the work 16 and the diameter of the sample 17. If, due to wear of the tool or for other reasons the diameter of the work 16 tends to grow slightly while the diameter of the sample 17 has not changed, then the increasing diameter of the work 16 positions the control member 84 toward the right in the member 75, resulting in a change in the rate of air bleed to the atmosphere and therefrom a positioning of the piston rod 13 to the right, whereby the tool 10 will turn the work to a slightly smaller diameter, thus compensating for wear on the tool. As the diameter of the work 16 approaches the correct diameter of the sample 17 the correct interrelation between the parts 84 and 75 is attained, and further movement of the piston rod 13 is stopped. Thus the arrangement of Fig. 2 provides a continuous check of the actual diameter of the work 16 with the desired diameter of the sample 17 irrespective of what that latter diameter may be.

If the cross section of the sample 17 is other than a circle at any or all longitudinal points, then desirably the sample 17 may be rotated with the work 16. Thus an elliptical or similar cross section sample may be reproduced, and in fact a square, triangular, or other cross section sample may be reproduced in the work piece 16 having proper regard for the rate of rotation of the work and sample, the rate of longitudinal travel, the shaping and sharpening of the tool, etc. In other words, the speed and speed of response of the various moving parts may be considerably different in turning a piece having a square cross section than in turning one having a cylindrical cross section. A simple method for rotating the sample 17 has been diagrammatically shown in Figure 1, and includes a gear 19 mounted for rotation with the spindle of the headstock 2. A second gear 20 is fixedly attached to the sample 17 and is driven from the gear 19 through an idler gear 21, journaled on any suitable means not shown. If at any time it is not desired to rotate the sample 17, then the idler gear 21 may be moved out of engagement with one of the gears 19 or 20.

For the construction, operation and advantageous features of the relay 28 and of the bleed valve 75, 84 reference may be had to my copending application, Patent No. 2,475,326, and to the copending application of Frederick A. Barnes, Patent No. 2,486,097. The construction and operational function of the bleed valve 75, 84 are substantially the same as of the tracer assemblies 19 and 68 of my parent Patent No. 2,422,682, of which the present application is a division. A pressure fluid is available to the bleed valve assembly at a substantially uniform pressure. Between the supply and the exit of the bleed valve assembly the pressure of the fluid will vary representatively of the positioning of the valve member 84 in the housing 75, and therefore of the rate of bleed to atmosphere of said pressure fluid. In the present embodiment I preferably use air as such pressure fluid, and discharge this freely to the atmosphere in accordance with the positioning of the element 84 in the element 75.

In general it will be seen that the pressure of the fluid which is applied to the bellows 27 is representative of the position of the element 84 in the element 75, and therefore is representative of the relation of diameters of the elements 16 and 17. I provide, therefore, a control sensitive to the actual size of the work piece in comparison to the actual size of the sample. From such control I preferably position the tool 10 in proper direction and amount to so form the work piece 16 that its diameter will agree with the diameter of the sample 17 at the proper reference point.

While I speak of having the two diameters agree, it will be understood that they agree if they are in proper proportion. For example, there may desirably be a definite scale relationship between the actual dimensions of 16 and 17.

While I have illustrated and described a preferred embodiment of my invention, it will be understood that this is by way of example only and not to be construed as limiting.

What I claim as new, and desire to secure by Letters Patent of the United States, is:

1. In a tracer control system for a machine tool having a frame and a relatively movable tool holder and work holder adapted to carry a tool and a workpiece, respectively, a sample having the desired shape of the workpiece, means for providing two-dimensional relative movement between said tool holder and work holder and including at least one slide on said frame, one of said tool holder and work holder being mounted on said slide to effect said two-dimensional relative movement, said tracer control system including, means supporting said sample on said frame in the same orientation as said workpiece, a first feeler element slidably mounted on said slide and resiliently urged in a direction to contact said workpiece substantially adjacent the cutting position of the tool, a second feeler element slidably mounted on said slide and resiliently urged in a direction to contact said sample, power means to move said slide, fluid pressure means interconnected with said power means to control same, a valve housing having an axis, means to move said valve housing in accordance with movements of one of said feeler elements, said axis being aligned with the transverse motion of the other of said feeler elements, a valve member disposed within said valve housing, means to move said valve member in accordance with the movement of said other of said feeler elements, said valve housing and valve member incorporated in said fluid pressure means and operative to vary the pressure of said fluid pressure means in accordance with variations in the relative shape of said sample and workpiece as said sample is traversed.

2. In a tracer control system for a lathe having a frame and a relatively movable tool holder and work holder adapted to carry a tool and a workpiece, respectively, a sample having the desired shape of the workpiece, a cross slide on said frame movable transversely of the workpiece axis, the tool holder being mounted on the cross slide, said tracer control system including, means for supporting said sample on said frame in axial parallelism with the workpiece, a first feeler element slidably mounted on said cross slide and resiliently urged in a direction to contact said workpiece, a second feeler element slidably mounted on said cross slide and resiliently urged in a direction to contact said sample, power means to move said cross slide, fluid pressure means interconnected with said power means to control same, a two-element fluid valve incorporated in said fluid pressure means and operative to vary the pressure in said fluid pressure means, said fluid valve including a valve housing and a valve member reciprocable therein, means to move said valve housing in accordance with the movement of one of said feeler elements, means to move said valve member in accordance with the movement of said other feeler element, said valve housing and valve member varying the fluid pressure of said fluid pressure means in accordance with variations in the relative shape of said sample and workpiece as said sample is traversed.

3. In a tracer control system for a lathe having a frame and a relatively movable tool holder and work holder adapted to carry a tool and a workpiece, respectively, a sample having the desired shape of the workpiece, a carriage on said frame positionable axially relative to said work holder, a cross slide mounted on and adapted to be moved transversely of the carriage, the tool holder being mounted on the cross slide, said tracer control system including, means for supporting said sample on said frame in axial parallelism with the workpiece, means for rotating said sample, a first feeler element slidably mounted on said cross slide and resiliently urged in a direction to contact said workpiece substantially diametrically opposite the tool, a second feeler element slidably mounted on said cross slide and resiliently urged in a direction to contact said sample, power means to move said cross slide, fluid pressure means interconnected with said power means to control same, a two-element fluid valve incorporated in said fluid pressure means and operative to vary the pressure in said fluid pressure means, said fluid valve including a valve housing and a valve member reciprocable therein, means to move said valve housing in accordance with the movement of one of said feeler elements, means to move said valve member along the axis of said valve housing in accordance with the movement of said other feeler element, said valve housing and valve member varying the fluid pressure of said fluid pressure means in accordance with variations in the relative shape of said sample and workpiece as said carriage is axially moved.

4. In a tracer control system for a lathe having a frame and a relatively movable tool holder and work holder adapted to carry a tool and a workpiece, respectively, a sample having the desired shape of the workpiece, a carriage on said frame positionable axially relative to said work holder, a cross slide mounted on and adapted to be moved transversely of the carriage, the tool holder being mounted on the cross slide, said tracer control system including, means for supporting said sample on said frame in axial parallelism with the workpiece, means for rotating said sample, a first feeler element slidably mounted on said cross slide and resiliently urged in a direction to contact said workpiece substantially diametrically opposite the tool, a second feeler element slidably mounted on said cross slide for translation parallel to said first feeler element and resiliently urged in a direction to contact said sample, power means to move said cross slide, fluid pressure means interconnected with said power means to control same, a two-element fluid valve incorporated in said fluid pressure means and operative to vary the pressure in said fluid pressure means, said fluid valve including a valve housing and a valve member reciprocable therein, means to move said valve housing in accordance with the movement of one of said feeler elements, means to move said valve member along the axis of said valve housing in accordance with the movement of said other feeler element, said valve housing and valve member varying the fluid pressure of said fluid pressure means in accordance with variations in the relative shape of said sample and workpiece as said carriage is axially moved.

5. In a tracer control system for a lathe having a frame and a relatively movable tool holder and rotatable work holder adapted to carry a tool and a workpiece, respectively, a sample having the desired shape of the workpiece, a carriage on said frame positionable axially relative to said work holder, a cross slide mounted on and adapted to be moved transversely of the carriage, the tool holder being mounted on the cross slide, said tracer control system including, means for supporting said sample on said frame in axial parallelism with the workpiece, means for rotating said sample in timed relation with the rotation of said workpiece, a first feeler element slidably mounted on said cross slide for translation parallel to said cross slide and resiliently urged in a direction to contact said workpiece substantially diametrically opposite the tool, a second feeler element slidably mounted on said cross slide for translation parallel to said cross slide and resiliently urged in a direction to contact said sample on substantially the same side of said sample as said first feeler element contacts said workpiece, power means to move said cross slide, fluid pressure means interconnected with said power means to control same, a two-element fluid valve incorporated in said fluid pressure means and operative to vary the pressure in said fluid pressure means, said fluid valve including a cylindrical valve housing and a valve member reciprocable therein, means to move said valve housing parallel to said cross slide movement in accordance with the movement of one of said feeler elements, means to move said valve member parallel to said cross slide movement in accordance with the movement of said other feeler element, said valve housing and valve member varying the fluid pressure of said fluid pressure means in accordance with variations in the relative shape of said sample and workpiece as said carriage is axially moved.

6. In a machine tool having a frame and a relatively movable tool and workpiece, a sample having the desired shape of the workpiece, means supporting said sample on said frame in axial parallelism with the workpiece, a first slide mounted on said frame and adapted to move in a first direction relative to said frame, a second slide mounted on said first slide and adapted to move transversely of said first direction, one of said tool and workpiece being mounted on said second slide, a first travel rest slidably mounted on said second slide and resiliently urged into contact with said work substantially diametrically opposite said tool, a second travel rest slidably mounted on said second slide and resiliently urged into contact with said sample, power means to move said second slide, fluid pressure means interconnected with said power means to control same, a two-element fluid valve incorporated in said fluid pressure means and operative to vary the pressure in said fluid pressure means, means to move one of the elements of said valve reciprocably in accordance with movements of said first travel rest, means to move the other of said elements of said valve reciprocably within said first valve element in accordance with movements of said second travel rest, said elements of the valve being operatively interconnected to vary the said fluid pressure in accordance with variations in the relative shape of said sample and workpiece as said first slide is moved in said first direction.

7. In a lathe having a frame and a relatively movable tool holder and work holder and for use with a sample having the desired shape of a workpiece, said lathe including means for supporting said sample on said frame in axial parallelism with the work holder, a cross slide on said frame adapted to be moved transversely of the work holder, the tool holder being mounted on the cross slide, a first feeler element slidably mounted on said cross slide and resiliently urged for contacting the workpiece held by said work holder, a second feeler element slidably mounted on said cross slide and resiliently urged for contacting said sample, power means to move said cross slide, fluid pressure means interconnected with said power means to control same, a valve housing having an axis, means to move said valve housing in accordance with movements of one of said feeler elements, said axis being aligned with the transverse motion of the other of said feeler elements, a valve member disposed within said valve housing, means to move said valve member in accordance with the movement of said other of said feeler elements, said valve housing and valve member varying the fluid pressure of said fluid pressure means in accordance with variations in the relative shape of said sample and workpiece as said sample is traversed.

CLARENCE JOHNSON.

REFERENCES CITED

The following references are of record in the file of this patent:

UNITED STATES PATENTS

| Number | Name | Date |
| --- | --- | --- |
| 2,372,427 | Johnson | Mar. 27, 1947 |
| 2,422,682 | Johnson | June 24, 1947 |